United States Patent [19]

Long

[11] Patent Number: 4,499,987
[45] Date of Patent: Feb. 19, 1985

[54] ACCUMULATOR FOR A CARTON FILLING AND PACKING PRODUCTION LINE

[76] Inventor: Charles P. Long, 216 Cleveland Ct., Mill Valley, Calif. 94941

[21] Appl. No.: 412,570

[22] Filed: Aug. 30, 1982

[51] Int. Cl.³ .............................................. B65G 37/00
[52] U.S. Cl. ...................................... 198/347; 198/426
[58] Field of Search ............... 198/347, 426, 432, 444, 198/491, 357, 448, 461

[56] References Cited

U.S. PATENT DOCUMENTS

| | | | |
|---|---|---|---|
| 3,470,996 | 10/1969 | Lee et al. | 198/347 |
| 3,499,555 | 3/1970 | Wahle | 198/347 |
| 3,587,674 | 6/1971 | Adkin | 198/461 X |
| 3,774,748 | 11/1973 | Dederer et al. | 198/444 |
| 3,976,190 | 8/1976 | Schmermund | 198/347 |
| 4,230,218 | 10/1980 | Kunzmann | 198/461 |
| 4,273,234 | 6/1981 | Bourgeois | 198/347 |
| 4,274,530 | 6/1981 | Carter et al. | 198/347 |

FOREIGN PATENT DOCUMENTS

| | | | |
|---|---|---|---|
| 1917062 | 10/1970 | Fed. Rep. of Germany | 198/44 |
| 1708885 | 11/1970 | Fed. Rep. of Germany | 198/347 |
| 52-11578 | 1/1977 | Japan | 198/3 |

Primary Examiner—Joseph E. Valenza
Assistant Examiner—Jonathan D. Holmes
Attorney, Agent, or Firm—Melvin R. Stidham

[57] ABSTRACT

An accumulator system for cartons moving to a case packer including a conveyor section interposed in the conveyor line. When a jam is detected on the delivery conveyor a stop member is activated to prevent movement of cartons. When a full slug of cartons is accumulated, an array of fingers lifts the slug an increment to clear the accumulator for more cartons from the receiving conveyor. When the delivery conveyor is again operative the stop member is retracted for normal flow from the receiving conveyor through the accumulator conveyor section. When adequate clearance is detected a second stop is activated to interrupt flow to the conveyor section so that, when it is clear of cartons, a slug of cartons in the accumulator may be reinserted into the production line.

11 Claims, 6 Drawing Figures

ACCUMULATOR FOR A CARTON FILLING AND PACKING PRODUCTION LINE

BACKGROUND OF THE INVENTION

In the packing of many dry foods, soaps, cleaning powders and the like, the cartons are filled and sealed and then moved along a conveyor line to the packing station wherein they are placed in cases. In the event that there is a delay or breakdown at the case packing station, it is necessary to shut down the carton filling station once the conveyor line between the two stations is full. That is, the production of the carton filling station is dependent entirely upon the capacity of the case packing station to handle its output, and if the case packing station is down for any reason, it is necessary to shut down the carton filling station and, perhaps, the entire production line.

OBJECTS OF THE INVENTION

It is an object of this invention to provide a system for enabling the carton filling station to continue operation despite shut downs at the case packing station.

It is a further object of this invention to avoid downtime of the carton filling station despite temporary inability of the case packing station to handle its output.

It is a further object of this invention to provide a system for receiving and storing the output of the carton filling station during downtimes at the case packing station.

It is still a further object of this invention to provide a means for withdrawing filled cartons from the conveyor line to the case packing station during downtimes thereof and for reinserting cartons when the capacity to handle them has been restored.

Other objects and advantages of this invention will become apparent from the description to follow, particularly when read in conjunction with the accompanying drawings.

SUMMARY OF THE INVENTION

In carrying out this invention, I provide an accumulator which is installed in the conveyor line between the carton filling and case packing stations. When a jam-causing delay occurs at the case packing station, a stop member is energized to prevent further delivery of cartons from the accumulator and, when the section on the accumulator conveyor section is full, a row of lift fingers extending from belts or chains is raised an increment to lift that block of cartons above the conveyor to enable further loading onto the accumulator section. This retention and shunting of groups of cartons continues as long as the jam continues or until the entire accumulator is loaded, at which time the entire line, of necessity, is shut down.

After the case packing line is reactivated, and detecting means indicate a capacity to handle more cartons, a second stop member is energized to prevent further cartons from entering into the accumulator section. Then, when the section itself is clear of cartons, detecting means energize a reverse drive for the acumulator conveyor to lower a group of cartons back onto the section to reinsert it into the line. Following this, normal production flow continues until the capcity to handle an additional slug of cartons is indicated, at which time the reinsertion process is repeated.

DRAWINGS

DESCRIPTION OF A PREFERRED EMBODIMENT

Figures 1, 2:
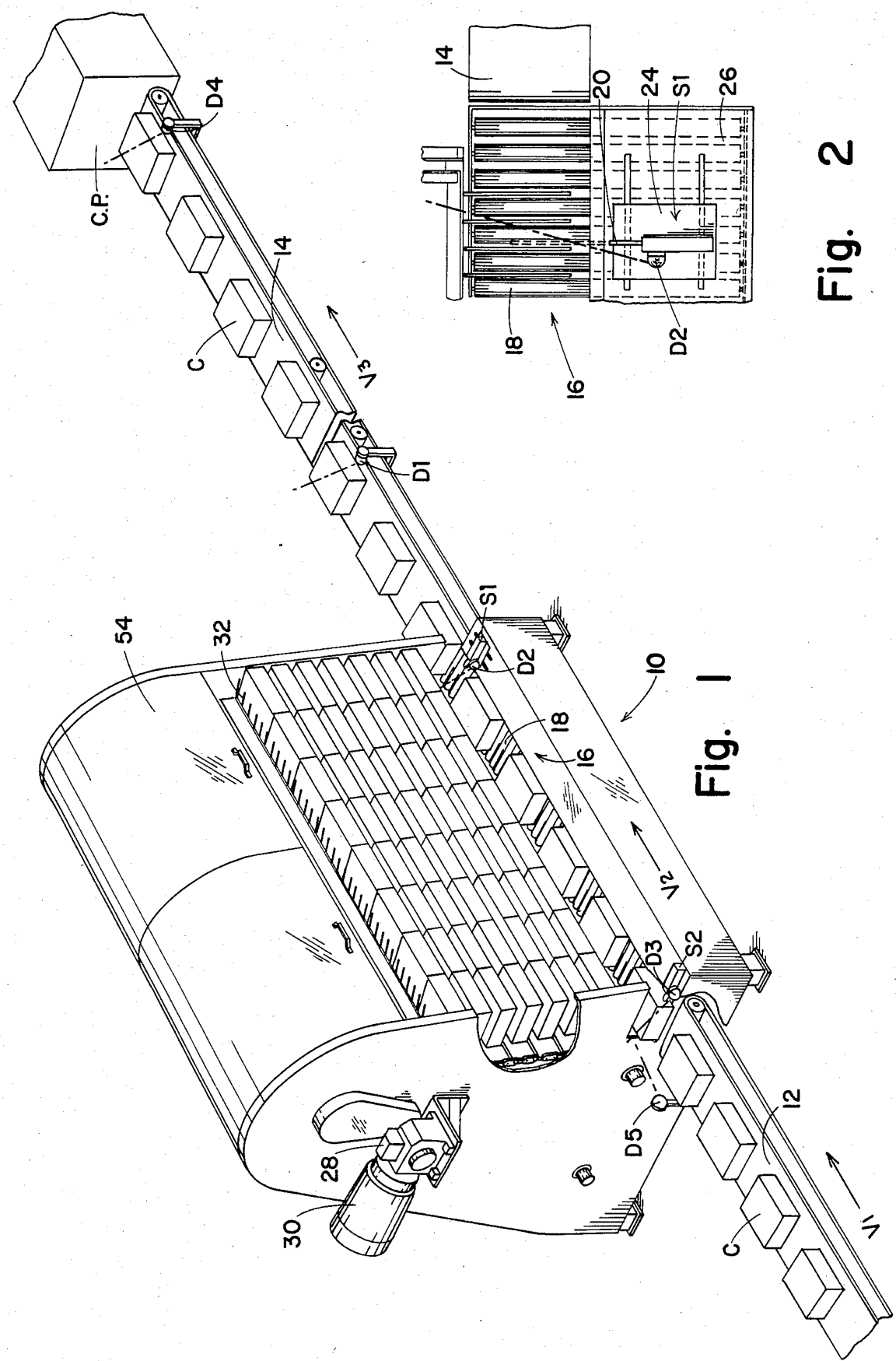
FIG. 1 is a view in perspective showing the accumulator of this invention installed in a conveyor line.
FIG. 2 is a partial view of the first stop arrangement.

Referring now to FIG. 1 with greater particularity, the carton accumulator 10 of this invention is disposed between a receiving conveyor 12 from a carton filling station (not shown) and an output or delivery conveyor 14 directing the cartons C to a case packing station C.P. The accumulator 10 itself, forms part of the conveyor and, for that purpose, includes a conveyor section 16, having spaced transverse members 18 for supporting the carton and some means for moving the cartons along the transverse members 18 to the outlet conveyor 14. In fact, the supporting and transporting means may be combined by providing driven rollers 18 as the transverse support member to move the cartons by friction from the conveyor 12 to the conveyor 14.

In normal operation as shown in FIG. 1 conveyor section 16 of the accumulator is simply a part of the conveyor system to move cartons C from the receiving conveyor 12 to the output conveyor 14 to the case packing station C.P. Generally, the conveyor 14 is driven at a higher velocity $V_3$ than that $V_1$ of the conveyor 12 and, preferably, the drive rollers 18 on the accumulator section are driven to move the cartons C at an intermediate speed $V_2$ whereby the cartons will be gradually separated further as they move from belt 12 to the case packer C.P.

There may be brief shut downs at the case packing station which are not of sufficient duration to justify activation of the accumulator 10. Accordingly, a jam detector D1 is placed well upstream of the case packer C.P. so that there must be a substantial back-up of cartons C before the accumulator 10 is placed in operation. The jam detector D1 may be in the form of a photoelectric relay and is operative to sense across the conveyor 14 to ensure that there is at least a minimum space between cartons on the delivery conveyor or belt 14. If this gap is closed, the detector D1 is energized to transmit a signal to activate a second detector D2 located at the delivery end of the accumulator conveyor section 16. The detector D2 is operative to scan transversely across the conveyor section 16 to seek out an opening between cartons C. When such an opening is detected, the detector D2 energizes a solenoid-operated first spear stop member S1, to project a stop arm 20 (FIG. 2) across the pathway of cartons C moving through the accumulator 10 on the conveyor section 16 to prevent further transporting of cartons onto the delivery belt 14.

As shown in FIG. 2, the stop member 20 is mounted, with the detector D2, on a mounting plate 24 which is slidable along a base plate 26 so that its position along the carrier section 16 is adjustable. This will permit the stop member to be positioned so that a full block or slug of cartons C blocked behind it may be lifted from the carrier section 16 without allowing any to fall back onto the conveyors 12 or 16. As also shown in FIG. 2, the detector D2 scans across the conveyor 16 at a slight angle so that it will seek a space sufficient to enable the retracted stop spear 20 to project across the path of the cartons C without damage to any. When a full slug of cartons is contained on the conveyor 16, a third detector D3 is energized when its beam is interrupted for more than a predetermined time limit, as would occur when the cartons on the conveyor 12 begin to jam up. When the full slug detector D3 is energized in indexing device 28 on the conveyor drive motor 30 is activated to raise a row of lift fingers thereon 32 to an increment sufficient to clear the path for more cartons which are then allowed to proceed to the first stop S1. This continues as long as the first detector D1 remains energized by reason of the fact that the cartons C on the delivery belt 14 are jammed up, or in the event that the accumulator 10 reaches full capacity as will be hereinafter described.

Figure 3:
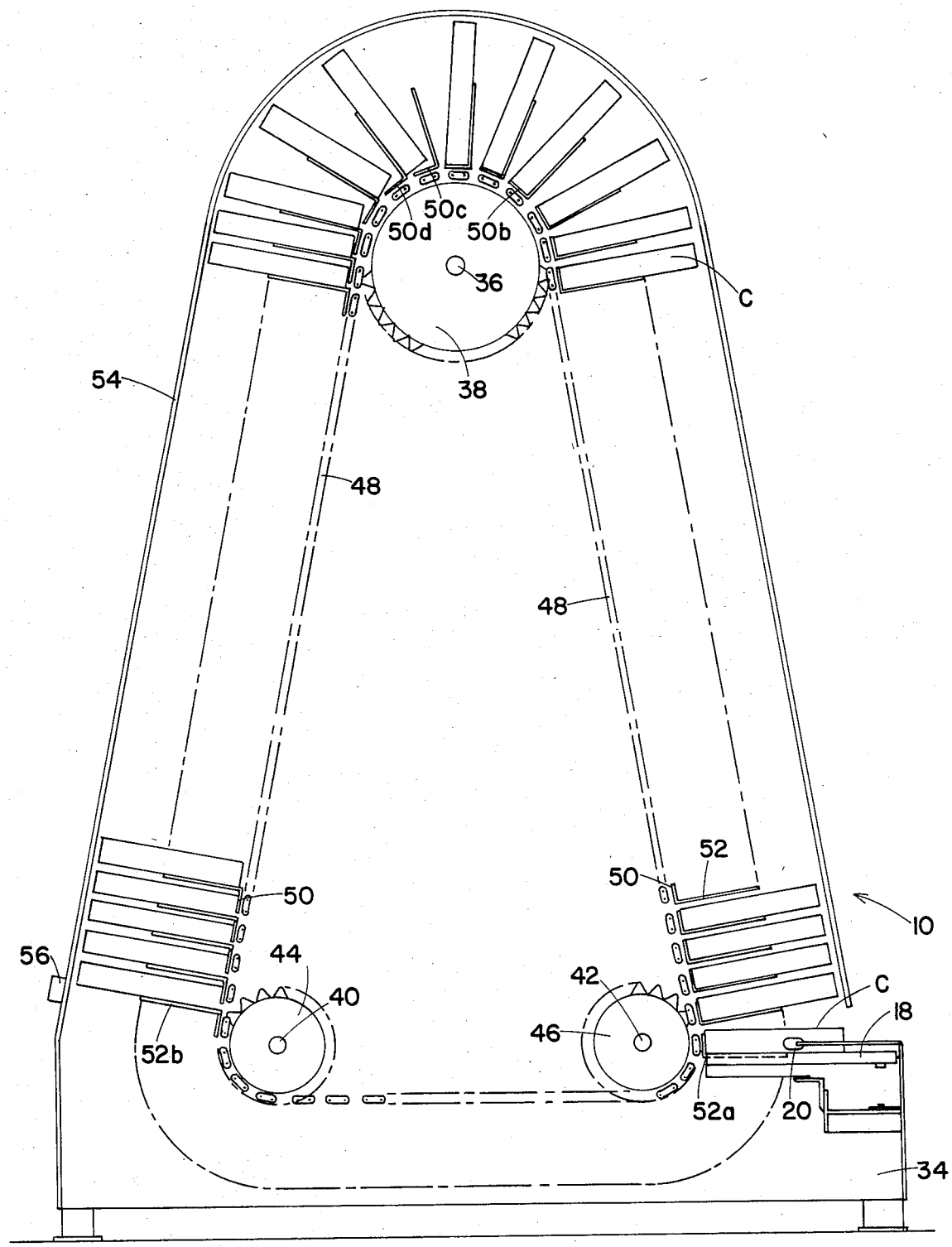
FIG. 3 is a vertical section view of the accumulator.

Referring now to FIG. 3, the accumulator 10 of this invention, includes a base 34 on which are supported a main drive shaft 36 with sprockets 38 and a pair of lower spaced idler shafts 40 and 42 with sprockets 44 and 46. Engaged over the sprockets 38, 44 and 46 are chains 48 to which are secured at spaced intervals elongated carrier bars 50, which extend substantially the length of the accumulator conveyor section 16 and along each of which is mounted a plurality of spaced lifter fingers 52 which, in their lowermost position 52a nest between the drive rollers 18 of the accumulator conveyor section 16. A suitable safety or dust cover 54 may be provided over the arrays of lifting fingers 52.

Each time a full slug of cartons C fills the accumulator conveyor section 16, the drive motor 30 is energized to drive the sprocket 38 an increment to move the lift fingers 52 upward an amount sufficient to clear the accumulator conveyor section 16 to receive a succeeding block of cartons C. In absence of any clearing signal from the first detector D1, this will continue until some suitable means such as a photoelectric relay or limit switch 56 indicates that the accumulator 10 has reached full capacity. In this event, the accumulator 10, as well as the receiving conveyor 12, are inactivated until the system repairs can be completed.

It should be noted that the lower most lifter fingers 52a on the input side are disposed approximately horizontally between the transverse support members or rollers 18. Hence, as soon as the cartons C are moved up from the drive rollers 18, the lift fingers will be disposed at a slight upward angle so that the cartons C are firmly supported on the lifter fingers 52, while resting back against the transverse bars 50. This continues until the cartons pass over the vertical centerline of the top sprocket 38, at which point the cartons shift by gravity from the tops of the lifters 52 to the bottom side of the next preceeding array of lifters while still resting on the transverse carrier members 50. Proceeding down the back side of the run of the sprocket chain 48 the cartons remain on the inverted sides of the fingers 52 and, with the chain sloping downwardly and outwardly, they continue to be urged by gravity to the transverse carrier bars 50 until they reach the lower most position 52b wherein the accumulator is full and the chain 48 is stopped, as previously described.

If, as the accumulator 10 is being filled with slugs of cartons as previously described, the case packer C.P. and conveyor 14 are returned to operation, the cartons C on the conveyor 14 will become spaced, and when a sufficient gap is detected by the first detector D1, it will de-energize the second detector D2 and condition the first stop member S1 to retract its stop 20. Preferably, the stop 20 is conditioned to remain extended as long as cartons are backed up behind it on the accumulator conveyor section 16 so as not to release an extensive slug of cartons C at once. However, once an already initiated accumulation cycle is completed as previously described, and a slug of cartons is elevated by an array of lifter fingers 52 the stop is retracted. This will allow any cartons on the receiving conveyor 12 to move right through the accumulator conveyor section 16 and onto the delivery conveyor 14.

With the delivery conveyor 14 moving at a faster rate $V_3$ than either the receiving conveyor 12 ($V_1$) or the accumulator conveyor reaction 16 ($V_2$), the spaces between cartons C will gradually increase as the system catches up. Accordingly, a fourth detector D4 is positioned along the delivery conveyor 14 a substantial distance downstream of the accumulator conveyor 16 to ensure that a full slug of cartons C can be reinserted into the system from the accumulator 10, without causing interfering jams in the event of subsequent downtime of the delivery conveyor 14.

The fourth detector D4 is placed a substantial distance downstream of the accumulator 10 and scans across the delivery belt 14 at an angle to ensure that the proper spacing between cartons has worked its way well downstream of the accumulator. When the cartons C are adequately spaced at that position, the detector D4 generates a signal to generate a second stop member S2 to prevent any further cartons C from moving from the receiving conveyor 12 onto the accumulator conveyor section 16. Now, a fifth detector D5 comes into play.

The fifth detector D5 is positioned at the upstream end of the accumulator 10 to scan down the length of the conveyor section 16 and is operative to generate a signal when that section 16 is completely clear of cartons C. When this occurs, the indexing device 28 for the accumulator conveyor drive motor 30 is energized to move the chairs 48 in a reverse direction through a full increment so that a full slug of cartons C is lowered onto the drive rollers 18 of the accumulator conveyor section 16. A short interval after this slug of cartons has been so deposited, the second stop member S2 is de-energized to retract and again allow normal flow of cartons from the receiving conveyor 12.

Once a slug of cartons C has been reinserted as just described, and the stop S2 is withdrawn, the conveyors 12, 16 and 14 continue as a normal operation until such time as the fourth detector D4 detects a sufficient space between cartons C to accommodate another slug of cartons from the accumulator 10 after a suitable delay to ensure that the slug of cartons just reinserted has passed the fourth detector D4. If this occurs, the fourth detector D4 will energize the second stop S2 to block cartons coming in from the receiving conveyor 12 and, when the fifth detector D5 sees that the accumulator conveyor 16 is free of cartons, it will energize the incremental drive means 28, 30 to move the conveyor chains 48 back down another increment to deposit another slug of cartons onto the driven rollers 18.

Thereafter, should the detector D4 detect sufficient space to accommodate another slug of cartons C the stop S2 will be activated to prevent delivery of cartons from the conveyor belt 12 until the conveyor 16 is clear to receive another slug of cartons C. If, on the other hand, the detector D1 detects a jam on the delivery belt 14, the stop S1 will be energized to prevent movement of cartons from the conveyor 16 to the delivery conveyor 14 for further accumulation of slugs of cartons, as previously described.

OPERATION

Normal operation of the system is as shown in FIG. 1 with cartons C moving along the receiving conveyor 12 at a relatively low velocity $V_1$, through the accumulator section 16 at medium velocity $V_2$ and then to the case packer C.P. by way of the delivery conveyor 14 at relatively high velocity $V_3$.

Figure 4:
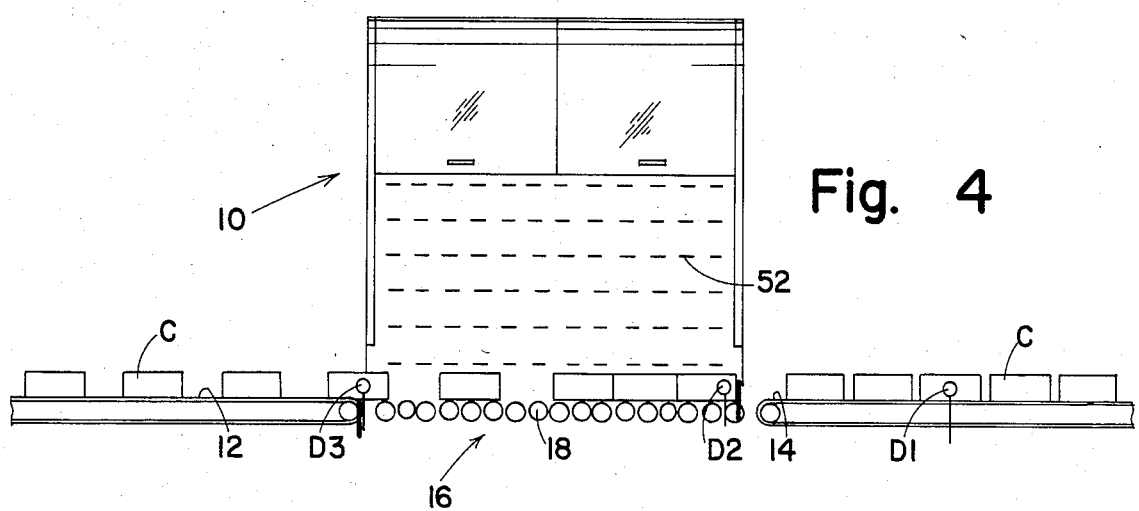
FIGS. 4, 5 and 6 are schematic elevations showing different stages of operation.

When as shown at FIG. 4, the first detector D1 detects a jam on the delivery belt 14 it energizes the second detector D2 which activates the first stop S1 when a space between cartons is aligned therewith. This starts the accumulation of a slug of cartons on the conveyor section 16.

Figure 5:
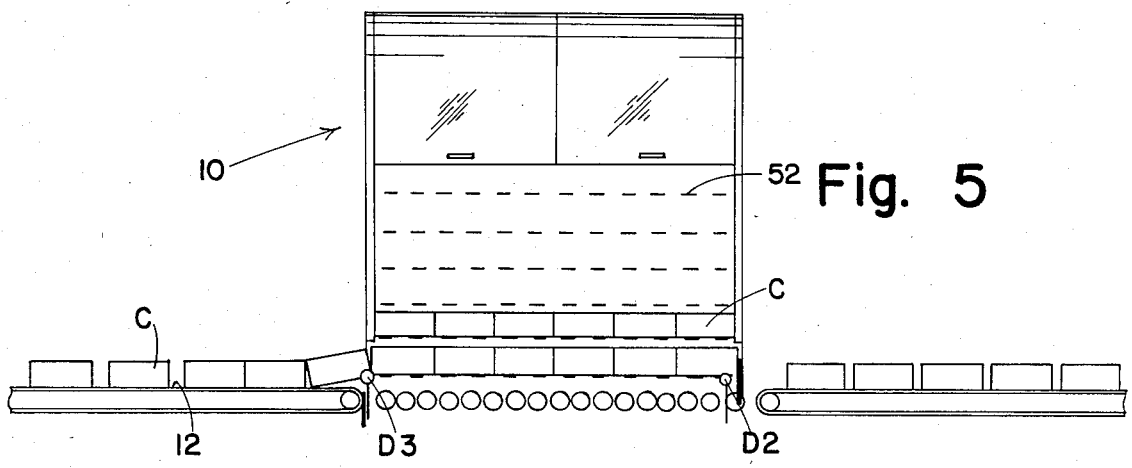
Figure 6:
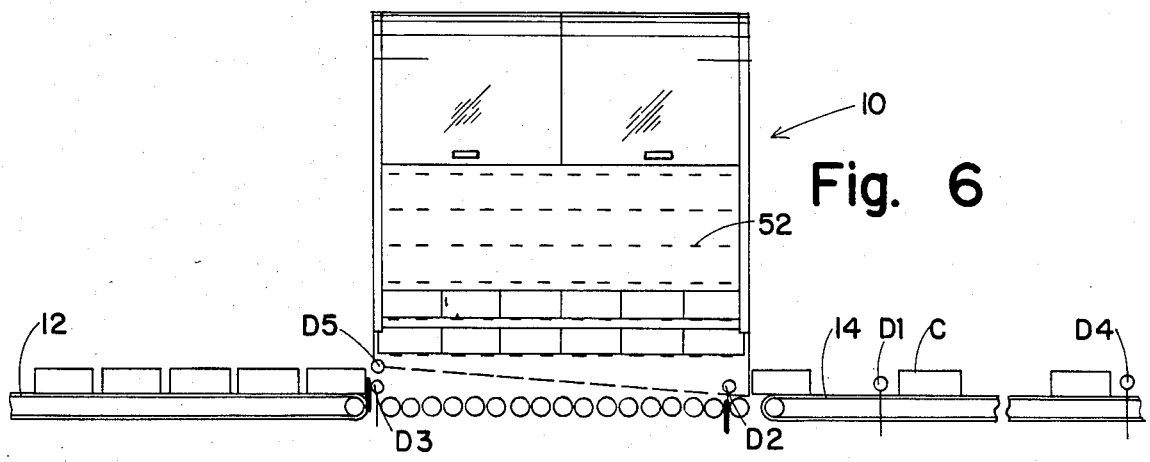

When the cartons on conveyor 16 back up to the third detector D3, it operates the accumulator drive to raise an array of fingers 52 (FIG. 5) through an increment to clear the next slug of cartons for movement to the first stop S1. This continues until the first detector D1 "sees" adequate clearance between cartons C on the delivery belt 14, to condition the first stop S1 to be retracted as soon as any accumulator cycle in process is completed by raising a slug of cartons above the drive rollers 18. Thereafter, flow continues as in FIG. 1.

Then, when the fourth detector D4 spots adequate clearance between cartons C it will energize (1) the second stop member S2 to prevent the entry into the accumulator section 16 of additional cartons and (2) the fifth detector D5 which scans the length of the conveyor section 16. When all cartons C have moved clear of the section 16 the fifth detector D5 energizes the accumulator drive to lower a slug of cartons onto the drive rollers 18, thus reinserting them into the production line.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed as invention is:

1. An accumulator system for cartons moving along a conveyor line between first and second work stations comprising:
   a generally horizontal conveyor section including a plurality of generally parallel, transverse support rollers of small diameter;
   said section adapted to be interposed between an input conveyor moving at a first velocity from said first work station and an output conveyor moving at a greater velocity to said second work station;
   said rollers being rotated to move cartons at an intermediate velocity along said section to said output conveyor;
   a first stop member at the downstream end of said section movable when energized from a retracted position out of the path of cartons on said section to an extended position blocking movement of cartons thereon;
   a jam detector positioned beyond the downstream end of said section and operative to generate a jam signal when cartons moving along said output conveyor are in abutment;
   means operable in response to a jam signal to energize said first stop member;
   a plurality horizontal rows of spaced, elongated carrier bars approximately coextensive with and adjacent said section;
   a plurality of transverse lift fingers closely spaced along, and extending from, each of said carrier bars to be received between said support rollers; and
   means operative when said first stop member is extended and said section has a full load of cartons thereon to move said carrier bars upwardly an increment sufficient to lift said full load of cartons clear of the path of carton movement on said section.

2. The accumulator system defined by claim 1 wherein said means for energizing said first stop member comprises:
   a stop detector positioned at the downstream end of said section and energized by a jam signal;
   said stop detector being operative to generate a stop signal when it detects a space between cartons on the section opposite it;
   said first stop member being energized by a stop signal.

3. The accumulator system defined by claim 1 including:
   a full load detector positioned just ahead of the upstream end of said section and operative to produce a lift signal when cartons opposing it are in abutment;
   said carrier bar moving means being energized by a lift signal.

4. The accumulator system defined by claim 1 wherein:
   said jam signal is terminated to deenergize said last-named means when a space between cartons occurs opposite said jam detector.

5. The accumulator system defined by claim 1 including:
   a second stop member at the upstream end of said section movable when energized from a retracted position to an extended position, successively enabling and blocking movement of cartons to said section; and
   means operative when said second stop member is extended and said section is clear of cartons to lower said carrier bars through said increment to settle a load of cartons onto said support rollers.

6. The accumulator system defined by claim 5 including:
   an insert mode detector positoned well downstream of said jam detector to scan a length of said output conveyor and operative to produce an insert signal when cartons moving along said output conveyor are spaced a predetermined amount;
   and means operable in response to an insert signal to energize said second stop member.

7. The accumulator system defined by claim 6 including:
   a full load detector operative when energized by said insert signal to generate a second stop signal when spaces occur between cartons moving toward said section;
   said second stop means being energized by said second stop signal.

8. The accumulator system defined by claim 6 including:
   a clear section detector positioned to scan the length of said section and energized by said insert signal and operative to generate a drop signal when said section is clear of cartons;

said carrier bar lowering means being energized by said drop signal.

9. The accumulator system defined by claim 1 wherein:

said carrier bars are mounted on endless conveyor chains to follow a generally isosceles-triangle path, upward and away, and then downward and further away from said section so that cartons will be carried upward on the upper sides of said fingers and downward on the undersides thereof, gravity-biased toward said carrier bars in all positons;

the bottom, horizontal runs of said chains being free of cartons.

10. The accumulator system defined by claim 9 wherein:

said carrier bars are spaced apart slightly more than the thickness of a carton to minimize movement of said cartons from the upper sides of one array of fingers to the undersides of the next preceeding array of fingers.

11. The accumulator system defined by claim 9 including:

a capacity detector for deactivating said system when all of said carrier bar fingers have cartons thereon.

* * * * *